Figure 5:
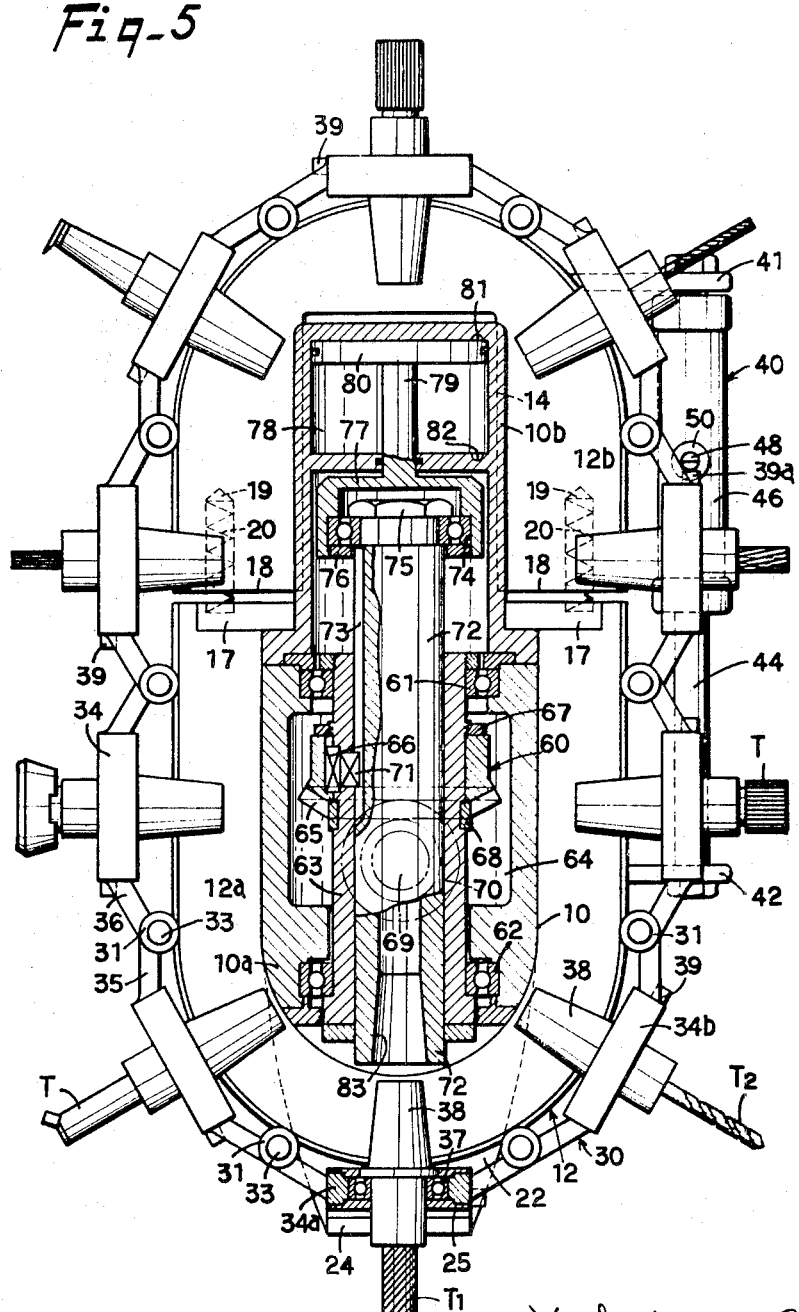

United States Patent
Sato et al.

[15] 3,635,569

[45] Jan. 18, 1972

[54] AUTOMATIC TOOL-CHANGING DEVICE FOR A MACHINE TOOL

[72] Inventors: Yoshikazu Sato, No. 1,026, 4-chome, Shimotakaido, Suginami-ku, Tokyo; Tsukasa Funakubo, No. 1,767, Kizukisumiyoshichiyou, Kawasaki-shi, Kanagawa-ken, both of Japan

[22] Filed: Mar. 4, 1969

[21] Appl. No.: 804,221

[52] U.S. Cl. ............................408/35, 29/26, 29/568
[51] Int. Cl. .............................................B23b 39/20
[58] Field of Search .................77/25; 29/26, 568; 90/56 X; 82/36.1; 408/35

[56] References Cited

UNITED STATES PATENTS

| | | | |
|---|---|---|---|
| 2,956,454 | 10/1960 | Hansen | 77/25 |
| 2,991,666 | 7/1961 | Charlat | 77/25 |
| 3,023,667 | 3/1962 | Charlat | 77/25 UX |
| 3,073,024 | 1/1963 | Hutchens et al. | 29/568 |
| 3,431,634 | 3/1969 | Balding | 29/568 |
| 3,577,617 | 5/1971 | Jones | 29/26 X |

*Primary Examiner*—Francis S. Husar
*Assistant Examiner*—F. R. Bilinsky
*Attorney*—Jay M. Cantor

[57] ABSTRACT

A tool-changing device for a machine tool for selectively presenting a desired tool to the work piece. A number of supports carrying selected tools are pivoted together to form an endless belt. The belt is moved around an elliptical track to present the desired tool to the work station. A power plant engages the tool in the station to provide motive power for the machining operation. The plant is disconnected from the tool after the operation is complete and the belt is moved to present the next tool in accordance with manual or automatic instructions.

9 Claims, 5 Drawing Figures

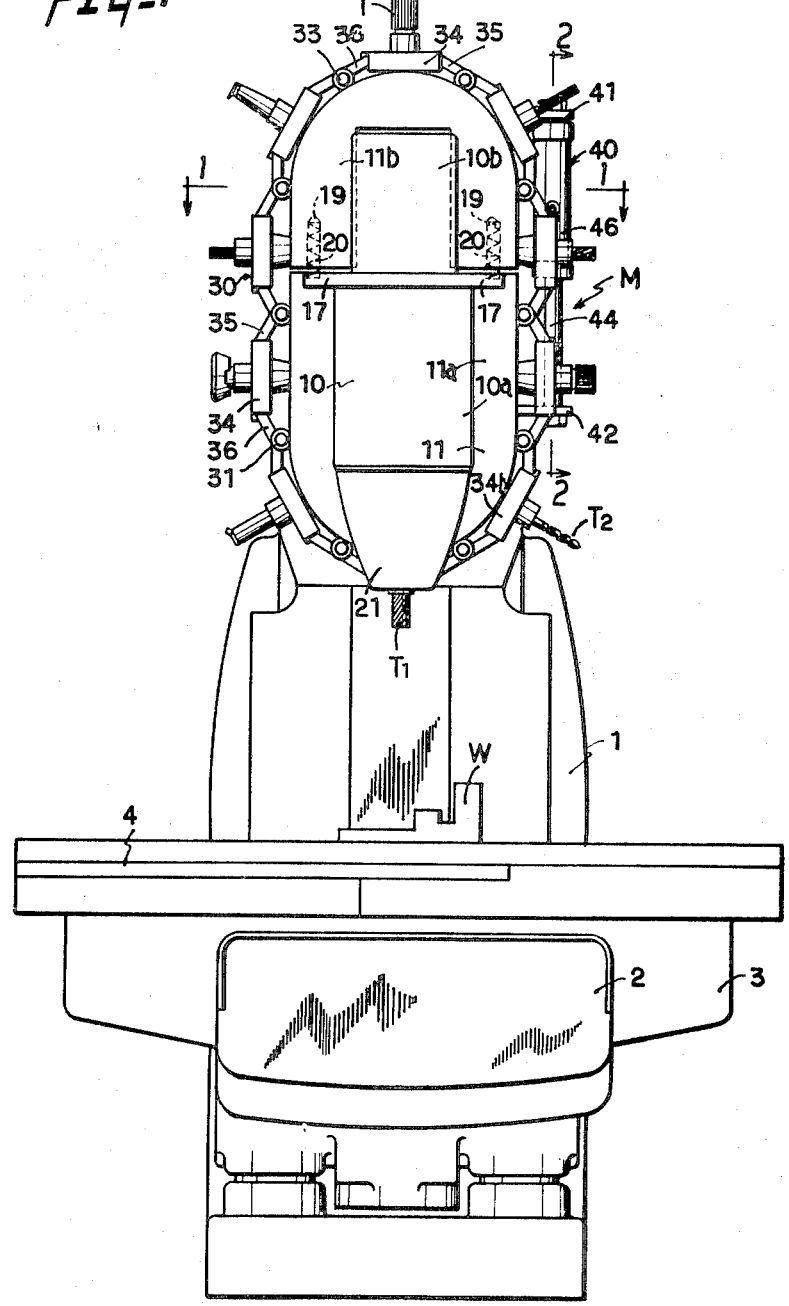

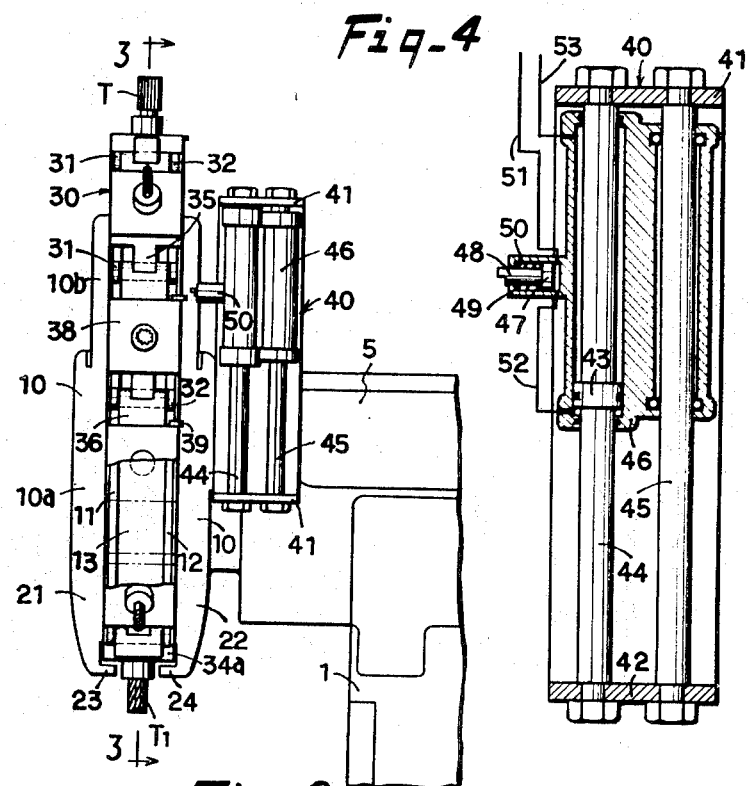
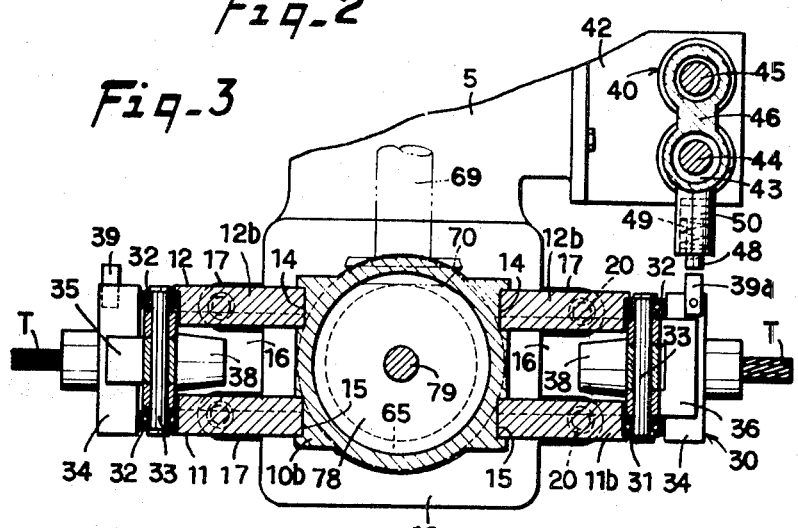

INVENTOR
Yoshikazu Sato
Tsukasa Funakubo
BY Harold L. Halpert
agent

AUTOMATIC TOOL-CHANGING DEVICE FOR A MACHINE TOOL

This invention relates to an automatic tool changing device where a plurality of toolholders are interlinked to form an endless chain thereby permitting the (rotatably mounted) tools to be successively transferred to and from the work position to perform machining operations on a workpiece. The tool changing cycle and interrelated operation of the machine tool, and the machining operation, is automatically controlled by a coded tape.

The object of this invention is to provide a tool changing device where the components are coordinated to permit effective, rapid successive automatic engagement and disengagement of the tool from the spindle head.

Another object of this invention is to provide a pair of parallel elliptical tracks surrounding the spindle head, by which the tool-holding chain is movably supported and guided to form an elliptical ring, the aforementioned tracks comprised of an upper and lower section with the upper section slidably mounted, and the lower section fixedly mounted, on the spindle head. The upper section being spring loaded to provide constant tension on the endless chain to insure proper tracking.

The tension on the tool-holding chain provides support to the tool holders to clear the clamping surfaces formed on the bottom extremity of the spindle housing, the clamping surfaces are provided to clamp the tool holder when the spindle head is lowered to position the tool holder and engage the tool; in which case the tension on the slidable upper section of the tracks is lowered to compress the tensioning springs.

Still another object of this invention is to provide a tool-holding ring-shaped chain capable of storing various types of tools and successively transferring these to the work performing position one at a time. Said chain formed by linking a plurality of tool holders to move in one plane with great freedom, and having provision for accurately and positively holding a plurality tools, the tools being engaged and driven by the spindle head while mounted on the tool holder and thereby providing the necessary stability and accuracy to the tool holding chain and the tools mounted thereon.

Yet another object of this invention is to provide a rugged and accurate tool transferring device by moving the ring-shaped tool-holding chain the distance of one tool. Said tool holder moving device being located on the back side of the straight portion of the chain and provided with a retractable pin to engage the tool holder during its downward travel and to retract and disengage the tool holder during its upward travel.

Another object of this invention is to provide a tool-rotating device comprising of a reciprocally movable spindle head which is housed in a spindle head housing centrally located within the elliptical tracks to engage and clamp the tool holder, moved to the work performing position, against the clamping surfaces located at the bottom extremity of the spindle head housing and thereby fixedly positioning each tool holder for accurately positioning each successive tool. When the machining operation is completed the spindle head is raised to disengage and free the tool holder.

These and other objects and advantages of the present invention will appear hereinafter as this disclosure progresses, reference being had to the accompanying drawings in which:

FIG. 1 is a front elevation view of a milling machine embodying this invention,

FIG. 2 is a side elevation view of spindle head, tool holder moving hydraulic cylinder assembly and the ram mounted on the column, with a part of the tool holder chain removed, FIG. 3 is an enlarged sectional view of the spindle head chain and cylinder assembly through section 1—1 in FIG. 1, FIG. 4 is an enlarged sectional view through section 2—2 of FIG. 1, FIG. 5 is a sectional view through section 3—3 of FIG. 2, the front track system is removed, one tool holder and the tool spindle head is sectionalized.

During the description of the invention, reference will be made to certain directions of movement, such as, for example "vertically" or "horizontally" or to positions of the various parts, such as, "above" or "below" but the invention should not be limited to any particular disposition of the parts.

Milling machine M shown in FIG. 1 comprises knee 2 adjustable in up or down parallel to column 1. Saddle 3 is adjustably supported by knee 2 to move in a backward and forward direction. Table 4 is adjustably mounted on saddle 3 to move in a horizontal direction (left to right, or vice versa). Movement of knee 2, saddle 3, and table 4 is controlled by signals furnished from coded tape by control systems well known in the art. Workpiece W is mounted by conventional means to table 4 and work is performed automatically thereon by the controlled selection of tools and related movement of the machine tool.

This milling machine M has column 1 with top movable horizontal member (or ram) 5 mounted thereon and spindle head 10 fixedly mounted on its front surface. Bottom half portion 10a of spindle head 10 fixedly supports two bottom track plates spaced with gap 13 to form parallel tracks shaped with a semicircular bottom and two straight sides. Top half portion 10b of spindle head 10 slidably supports two track plates 11b, 12b, spaced by a gap 16 by grooves 14, and 15. Bottom track plate 11a and upper track plate 12a, bottom track plate 11b and upper track plate 12b form a pair of parallel tracks namely front track 11 and rear track 12.

Slidably mounted top track assembly 11b, 12b is supported by springs 20 positioned by holes 19 formed in the track plates and by legs 17 with shallow positioning holes, said legs being attached to and protruding on both sides of the spindle head assembly at its approximate middle portion.

The above-described spring support serves to provide strong tension to tool holding chain 30 described in detail later, and thereby prevents any slack or play during movement of the chain on the aforedescribed top and bottom tracks. Furthermore the springs support tool holder 34a to form clearance gap 25 between clamping surfaces 23, 24 (described in detail later) and thereby allows the tool holders to move freely without touching these surfaces. Arms 21 and 22 (with L-shaped limiting fingers with surfaces 23, 24) extending from the front and back side of spindle head housing 10, are provided to limit movement of tool holder 34a holding tool T, and thereby serve to accurately position the tool in the work position (when the tool holder is engaged by the downward motion of the drive spindle).

Ring-shaped tool-holding chain 30 loaded with various tools is guided by a pair of elliptical-shaped tracks 11 and 12 mounted around spindle head 10. The chain is comprised of a plurality of tool holders 34 with arms 35 and 36 shaped to rotatably hinge by shaft 33 to which rollers 31 and 32 are mounted at each end to engage tracks 11, 12 and thereby convey the chain with minimum friction or rollers. Tool T is mounted on tapered tool holding spindle 38 which is rotatably mounted on tool holder 34 by bearing 37 and tapered end 38 rides within the gap 13, 16 formed between tracks 11 and 12. Tool-holding chain 30 is tensioned by springs 20 which support upper tracks 11b, 12b and thereby insures that the chain will ride tracks 11 and 12 without slack or play. Each tool holder 34 is fitted with tab 39 which is engaged by tool-moving cylinder 40; described in detail later, to move the chain the distance of one tool at one stroke to position each successive tool at the work performing station.

Tool-moving cylinder assembly 40 mounted on the side of ram 5 and is positioned on the back side of the tool-holding chain 30 to engage the chain during the straight portion of its downward travel. Cylinder assembly 40 is fixedly mounted on the side of ram 5 and comprises of cylinder 50 slidably mounted on piston rod 44 with piston 43 and parallel guide rod 45 mounted on end plates 41 and 42 of base plate 40 thereby permitting cylinder assembly 46 to reciprocate. A small cylinder 50 is attached with its axis normal to the side of cylinder 46. Cylinder 50 is equipped with piston 47 attached to pin 48 and spring loaded by spring 49 to retract pin 48 when oil pressure is removed from cylinder 50. Cylinder assembly 46 is confined to reciprocate without rotation by piston rod 44 and guide rod 45.

Two pipes 51 and 52 are connected to the bottom part of cylinder 50. Pipe 51 connects with the oil reservoir and oil pump through a magnet valve, pipe 52 connects with cylinder 46 below the lowest position of piston 43. Pipe 53 connects top of cylinder 46 to the oil reservoir and pump through a magnetic valve. The aforementioned magnetic valves are controlled by signals from limiting switches and coded tape. When pressurized oil is supplied to pipe 51, oil enters cylinder 50 and pin 48 is extended to engage lug 39a protruding from top part of tool holder 34. Pressurized oil enters cylinder 46 through pipe 52 and lowers cylinder 46 with cylinder 50 and pin 48 moving the tool holding chain one pitch, or the distance to move tool $T_1$ and replace it by tool $T_2$ at the work performing station. When the movement is completed, the magnetic valve is actuated to disconnect pipe 51 from the oil pump and connect it to the oil reservoir, simultaneously oil pressure is removed from cylinder 50 causing spring 49 to retract pin 48. Therefore when cylinder 46 is raised to position the next tool, pin 48 is disengaged from the tool holder causing tool-holding chain to remain stationary during this sequence of operation.

Spindle head 10 contains the driving mechanism to engage and rotate tool T to perform machining operations on work piece W. Spindle head 10 contains sleeve 63 journaled on bearings 61 and 62 to freely rotate. Sleeve 63 has bevel gear 65 secured thereto by key 66, ring 68 and nut 67 and is housed on hollow portion 64 of head housing 10. Shaft 69 is rotatably mounted in ram 5 and has bevel gear 70 which engages the aforedescribed bevel gear 65. Shaft 69 is driven by a drive motor which is controlled by coded tape.

Key 71 embedded in sleeve 63 slidably engages groove 73 in spindle shaft 72 which is free to move longitudinally up and down within sleeve 63 and driven to rotate with 63 by said aforementioned key 71. Bearing 74 is secured to the top extremity of spindle shaft 72 by nut 75. The outside journal of bearing 74 is fitted to housing 77 and secured by ring 76. A connecting rod 79 of housing 77 has a piston 80 in moving cylinder 78 formed in the upper spindle head housing 10b.

Openings 81 and 82 are formed at the top and bottom of cylinder 78, pipes connecting the openings through magnetic valves to an oil pump or oil reservoir to supply pressurized oil to either top or bottom of the piston or exhaust the oil into the oil reservoir according to signals received by the magnetic valve from coded tape. When pressurized oil is admitted into the top opening of cylinder 78 piston 80 drives spindle shaft 72 down, and when oil is admitted to the bottom opening of cylinder 78, when in the aforementioned position, the spindle shaft 72 is moved up.

Tapered opening 83 is formed in the bottom extremity of spindle shaft 72. This taper is formed to fit all the tapered tool holders 38 and thereby transmit rotatory motion to the tool without slippage. When spindle shaft 72 is lowered, tapered opening 83 engages tool-holder shaft end 38 and tool-holder body 34a is clamped against supporting finger surfaces 23 and 24 to position tool T and pressure fit tapered opening 83 with holder end 38, and is prepared for the machining operation on work piece W. When rotation of spindle 72 is stopped and spindle 72 is raised, tool holder 38 with tool T, becomes disengaged.

The above description explains the construction and function of the various components which are combined into a machine tool embodying this invention. The following explanation is furnished to further explain the interrelated operation of the various devices.

A coded signal recorded on tape causes the pressurized oil to enter cylinder 78 of the tool driving system 60 through opening 81. Oil pressure acts on piston 81 to lower the piston which lowers tool spindle 72 through connecting rod 79 and bearing housing 77. Tapered opening 85 on the bottom end surface of tool spindle 72 engages tapered tool holder 38 to push this down till tool holder assembly 34 engages limiting surfaces 23, 24. Tool-holder chain 30 is pushed down by compressing springs 20 supporting upper movable track assembly 11b, 12b. The next coded signal causes drive motor to rotate which in turn drives bevel gear 70 through shaft 69, bevel gear 70 drives bevel gear 65 which rotates spindle 72 by driving sleeve 63. In this manner tool T, is caused to rotate. Knee 2, saddle 3, table 4, move vertically or horizontally according to signals received from the coded tape and the programmed word operation is performed on the workpiece. When the work operation on workpiece W is completed, a signal from the coded tape causes the motor to stop and spindle 72 and tool T stop rotating. Simultaneously oil is introduced to the bottom side of piston 80 through opening 82 and piston 80 is raised. Oil from the upper part of piston 80 is exhausted through upper opening 81 into the oil reservoir. When piston 80 is raised, spindle 72 is raised so that tool holder end 38 holding tool T is released from the tapered fit in the tapered hole bored in spindle 72. When the tool is released, springs 20 are relieved so that the movable upper tracks rise and tool-holding chain 30 rises to free tool holder 34a from limiting surfaces 23, 24 to form clearance gap 26.

On the other hand when rotation of tool T stops and it is necessary to move workpiece W so that it will not obstruct movement of tool T, signals from coded tape cause movement of knee 2, saddle 3, table 4 in a downward or horizontal direction.

When spindle 72 is disengaged from tool holder 38 coded tape signal initiates pressurized oil to enter small cylinder 50 of the tool shifting mechanism and pin 48 protrudes to engage tab 39a of tool holder 34. Simultaneously oil flows into bottom part of piston 43 in cylinder 46 through pipe 52 causing cylinder 46 to descend. Descent of cylinder 46 causes movement of tool-holding chain 30 on tracks 11 and 12 so that tool holder 34b holding new tool $T_2$ is positioned over limiting surfaces 23, 24 in the work performing position whereas used tool $T_1$ is moved from the work position.

When new tool $T_2$ is positioned at the work performing position and cylinder 46 is at its lowest position a limiting switch is actuated, the signal from which causes the magnetic valve to operate, to stop the flow of the pressurized oil to pipe 51 and simultaneously pipe 51 is connected to the oil reservoir and pin 48 is retracted, pressurized oil is supplied to pipe 53 which causes cylinder 41 to rise and stop at its original position.

When tool $T_2$ is positioned at the work performing station, spindle 72 is lowered and the tool holder for new tool $T_2$ is engaged in the tapered hole of the spindle. The tool $T_2$ now can rotate and perform milling operations.

On the other hand workpiece W is moved to the desired position and the desired work performed on workpiece W.

When it is necessary to use the $n$th tool from tool $T_1$ cylinder 46 of tool moving cylinder assembly 40 is moved reciprocally $n$ times and thereby positions the $n$th tool at the work performing station.

We claim:

1. An automatic tool-changing device comprising a pair of tracks divided into upper and lower sections mounted around a spindle head located at a work performing station, the tracks being spring loaded to mutually expand and provide tension to a tool-holding ring-shaped chain loaded with a plurality of tools movably guided by said tracks, a tool shifting device which moves the tool-holding chain to position one tool at a time at the work performing station and driving means associated with the spindle movable into engagement with the tool at the work performing station for rotating it while it is maintained on the chain.

2. An automatic tool-changing device comprising a pair of tracks divided into upper and lower sections mounted around a spindle head and spring loaded to mutually expand and provide tension to a tool-holding ring-shaped chain loaded with a plurality of tools movably guided by said tracks, a tool-shifting device which moves the tool-holding chain to position one tool at a time at a work performing station and means movable relative to said tracks for rotating said one tool, said lower pair of track being shaped in the form of a U with a semicircle at the bottom and having two straight vertical sides, said upper pair of tracks being shaped in the form of an inverted U, the lower tracks being fixed to the lower half of a spindle head, and the upper tracks being slidably mounted on the upper half of a spindle head, and springs positioned in said lower half slidably supporting the upper pair of tracks, said pair of tracks together being in the form of an ellipse.

3. An automatic tool-changing device comprising a pair of tracks divided into upper and lower sections mounted around a spindle head and spring loaded to mutually expand and provide tension to a tool-holding ring-shaped chain loaded with a plurality of tools movably guided by said tracks, a tool-shifting device which moves the tool-holding chain to position one tool at a time at a work performing station, and means movable relative to said tracks for rotating said one tool, said tool-changing device utilizing a tool-holding ring-shaped chain comprising a plurality of tool holders each equipped with journaled bearings to rotatably hold a tapered tool holding spindle, each tool holder being provided with a pair of fixed arms on each side thereof rotatably connected by a plurality of rollers at each end of said arms.

4. An automatic tool-changing device as set forth in claim 2 wherein said tool-changing device utilizing a tool-holding ring-shaped chain comprises of a plurality of tool holders each equipped with journaled bearings to rotatably hold a tapered tool-holding spindle, each tool holder being provided with a pair of fixed arms on each side thereof rotatably connected by a plurality of rollers at each end of said arms.

5. An automatic tool-changing device comprising a pair of tracks divided into upper and lower sections mounted around a spindle head and spring loaded to mutually expand and provide tension to a tool-holding ring-shaped chain loaded with a plurality of tools movably guided by said tracks, a tool-shifting device which moves the tool-holding chain to position one tool at a time at a work performing station and means movable relative to said tracks for rotating said one tool, wherein the tool-shifting device comprises a guide rod extending between fixed support plates, a piston rod arranged in spaced parallel disposition relative to the said guide rod, a cylinder assembly slidably mounted on the spaced rods and movable axially thereof, the said piston being located in a cylinder within the cylinder assembly, fluid feed means for supplying fluid under pressure to one side of the piston thereby to effect movement of the cylinder assembly relative to the rods, an engagement cylinder extending transversely of the cylinder assembly, a spring-loaded piston within the engagement cylinder, the said fluid feed means further supplying fluid under pressure to the engagement cylinder thus to move the spring-loaded piston against the spring means thereof, the tool-shifting device being provided with a plurality of spaced lugs extending into the path of the spring-loaded piston when moved under control of the cylinder assembly.

6. An automatic tool-changing device as claimed in claim 2 wherein the tool-shifting device comprises a guide rod extending between fixed support plates, a piston rod arranged in spaced parallel disposition relative to the said guide rod, a cylinder assembly slidably mounted on the spaced rods and movable axially thereof, a piston on the piston rod fixed axially thereof, the said piston being located in a cylinder within the cylinder assembly, fluid means for supplying fluid under pressure to one side of the piston thereby to effect movement of the cylinder assembly relative to the rods, an engagement cylinder extending transversely of the cylinder assembly, a spring-loaded piston within the engagement cylinder, the said fluid feed means further supplying fluid under pressure to the engagement cylinder thus to move the spring-loaded piston against the spring means therefor, the tool-shifting device being provided with a plurality of spaced lugs extending into the path of the spring-loaded piston when moved under control of the cylinder assembly.

7. An automatic tool-changing device as claimed in claim 3 wherein the tool-shifting device comprises a guide rod extending between fixed support plates, a piston rod arranged in spaced parallel disposition relative to the said guide rod, a cylinder assembly slidably mounted on the spaced rods and movable axially thereof, a piston on the piston rod fixed axially thereof, the said piston being located in a cylinder within the cylinder assembly, fluid feed means for supplying fluid under pressure to one side of the piston thereby to effect movement of the cylinder assembly relative to the rods, an engagement cylinder extending transversely of the cylinder assembly, a spring-loaded piston within the engagement cylinder, the said fluid feed means further supplying fluid under pressure to the engagement cylinder thus to move the spring-loaded piston against the spring means therefor, the tool-shifting device being provided with a plurality of spaced lugs extending into the path of the spring-loaded piston when moved under control of the cylinder assembly.

8. An automatic tool-changing device as claimed in claim 4 wherein the tool-shifting device comprises a guide rod extending between fixed support plates, a piston rod arranged in spaced parallel disposition relative to the said guide rod, a cylinder assembly slidably mounted on the spaced rods and movable axially thereof, a piston on the piston rod fixed axially thereof, the said piston being located in a cylinder within the cylinder assembly, fluid feed means for supplying fluid under pressure to one side of the piston thereby to effect movement of the cylinder assembly relative to the rods, an engagement cylinder extending transversely of the cylinder assembly, a spring-loaded piston within the engagement cylinder, the said fluid feed means further supplying fluid under pressure to the engagement cylinder thus to move the spring-loaded piston against the spring means therefor, the tool-shifting device being provided with a plurality of spaced lugs extending into the path of the spring-loaded piston when moved under control of the cylinder assembly.

9. An automatic tool-changing device comprising a pair of tracks divided into upper and lower sections mounted around a spindle head and spring loaded to mutually expand and provide tension to a tool-holding ring-shaped chain loaded with a plurality of tools movably guided by said tracks, a tool shifting device which moves the tool-holding chain to position one tool at a time at a work performing station and means movable relative to said tracks for rotating said one tool, including a tool-rotating mechanism located in the spindle head and a motor-driven sleeve rotatably mounted on bearings in the lower part of the spindle head, a driven spindle shaft slidably mounted within the sleeve for movement axially thereof, means for reciprocally moving said spindle shaft including a housing at the remote extremity of the spindle shaft, a connecting rod, a fluid piston secured to the said rod, and the cylinder in the upper part of the spindle head and within which the piston moves, the said spindle shaft having a tapered hole formed at its lower extremity adapted to receive and to engage the tapered end of a rotatably mounted shank positioned at the work performing station on movement of the spindle shaft in one direction and to become disengaged from and to release the shank upon movement of the spindle in the opposite direction.

* * * * *